US009621334B2

(12) United States Patent
Huang et al.

(10) Patent No.: US 9,621,334 B2
(45) Date of Patent: Apr. 11, 2017

(54) DATA TRANSMISSION METHOD AND SYSTEM

(75) Inventors: David Huang, Taoyuan County (TW); Wei-Chih Chang, Taoyuan County (TW); Tsung-Pao Kuan, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 1837 days.

(21) Appl. No.: 12/212,418

(22) Filed: Sep. 17, 2008

(65) Prior Publication Data
US 2009/0074122 A1 Mar. 19, 2009

(30) Foreign Application Priority Data
Sep. 19, 2007 (TW) .............................. 96135054 A

(51) Int. Cl.
H03D 1/00 (2006.01)
H04J 11/00 (2006.01)
H04L 7/02 (2006.01)
H04B 7/04 (2017.01)
H04L 7/033 (2006.01)

(52) U.S. Cl.
CPC ................. H04L 7/02 (2013.01); H04B 7/04 (2013.01); H04L 7/033 (2013.01)

(58) Field of Classification Search
CPC . H04L 7/033; H04L 7/0087; H04L 25/03146; H04L 7/0083; H04L 25/00; H04L 25/4917; H04L 25/0282
USPC ................................... 375/260, 343; 370/208
See application file for complete search history.

(56) References Cited

U.S. PATENT DOCUMENTS

| 5,255,376 | A | 10/1993 | Frank |
| 5,526,490 | A | 6/1996 | Nishikawa |
| 5,686,913 | A * | 11/1997 | Coln ........................ G06F 5/00 341/142 |
| 6,362,781 | B1 * | 3/2002 | Thomas ............... H04B 7/0854 342/367 |
| 6,553,336 | B1 * | 4/2003 | Johnson et al. ............. 702/188 |
| 6,765,969 | B1 * | 7/2004 | Vook ........................ H04L 1/06 375/259 |
| 7,379,517 | B1 * | 5/2008 | Black ............................ 375/354 |
| 2002/0114400 | A1 * | 8/2002 | Bombay ............. H04L 27/2657 375/260 |
| 2003/0126333 | A1 * | 7/2003 | Bormann et al. ............. 710/240 |

(Continued)

FOREIGN PATENT DOCUMENTS

| CN | 1347611 A | 5/2002 |
| CN | 1196066 C | 4/2005 |

(Continued)

Primary Examiner — Daniel Washburn
Assistant Examiner — Sarah Hassan
(74) Attorney, Agent, or Firm — Birch, Stewart, Kolasch & Birch, LLP

(57) ABSTRACT

A data transmission method for a data transmission system including a first device and a second device is disclosed. The method comprises the steps of transmitting a clock signal to synchronize the first device and the second device; transmitting a mode signal from the first device to the second device, wherein the mode signal indicates a transmission mode between the first device and the second device; and transmitting a serial data between the first device and the second device based on the clock signal, wherein the length of the serial data is determined based on the transmission mode.

7 Claims, 3 Drawing Sheets

(56) References Cited

U.S. PATENT DOCUMENTS

| | | | |
|---|---|---|---|
| 2004/0001563 A1* | 1/2004 | Scarpa | H04L 27/2675 375/326 |
| 2004/0049619 A1* | 3/2004 | Lin | 710/105 |
| 2005/0083930 A1* | 4/2005 | Chen et al. | 370/389 |
| 2005/0163263 A1* | 7/2005 | Gupta | H04L 27/2656 375/343 |
| 2005/0270969 A1* | 12/2005 | Han | H04B 7/2621 370/210 |
| 2005/0286643 A1* | 12/2005 | Ozawa et al. | 375/242 |
| 2006/0025079 A1* | 2/2006 | Sutskover | H04L 25/0226 455/67.11 |
| 2007/0014272 A1* | 1/2007 | Palanki | H04B 7/04 370/344 |
| 2007/0064735 A1 | 3/2007 | Hoo et al. | |

FOREIGN PATENT DOCUMENTS

| | | |
|---|---|---|
| EP | 0 280 391 A3 | 8/1988 |
| EP | 0 377 136 A2 | 7/1990 |
| EP | 1 061 453 A1 | 12/2000 |
| EP | 1 860 815 A1 | 11/2007 |
| WO | WO-01/91407 A1 | 11/2001 |

* cited by examiner

DATA TRANSMISSION METHOD AND SYSTEM

CROSS REFERENCE TO RELATED APPLICATIONS

This Application claims priority of Taiwan Patent Application No. 096135054, filed on Sep. 19, 2007, the entirety of which is incorporated by reference herein.

BACKGROUND OF THE INVENTION

Field of the Invention

The invention relates to a data transmission method, and more particularly to a serial data transmission method.

Description of the Related Art

When two electronic devices transmit data to each other, a suitable data transmission method is required to synchronize the data between the two electronic devices and format the transmitted data to be compatible with both electronic devices. In generally, the data transmission method comprises a parallel data transmission method and a serial data transmission method. The advantage of the parallel data transmission method is that bandwidth is wider, but the disadvantage is that the quality of high frequency data transmission is poor. The advantage of the serial data transmission method is that in the quality of high frequency data transmission is relatively better, but the disadvantage is that the bandwidth is limited.

With technological development, demand for high speed data transmission rates has increased. The conventional parallel data transmission method provides a wider range, however, data transmission errors increase due to higher speeds. Meanwhile, the conventional serial data transmission method utilizes a time division multiplexing mechanism to increase data transmission rates, wherein the signal lines for the time division multiplexing mechanism is relatively less costly and easier to implement.

BRIEF SUMMARY OF THE INVENTION

An embodiment of a data transmission method for a data transmission system including a first device and a second device is disclosed. The method comprises the steps of transmitting a clock signal to synchronize the first device and the second device; transmitting a mode signal from the first device to the second device, wherein the mode signal indicates a transmission mode between the first device and the second device; transmitting a serial data between the first device and the second device based on the clock signal, wherein the length of the serial data is determined based on the transmission mode.

Another embodiment of a data transmission method for a data transmission system including a first device and a second device is disclosed. The method comprises the steps of transmitting a clock signal to synchronize the first device and the second device; transmitting a mode signal from the first device to the second device, wherein the mode signal indicates a transmission mode between the first device and the second device; transmitting a control signal to the second device based on the clock signal, wherein the length of the control signal is determined based on the mode signal, and wherein when the transmission mode is a first transmission mode, the control signal comprises m bits for indicating a memory address, and when the transmission mode is a second transmission mode, the control signal comprises n bits for indicating whether a buffer is full, and m is larger than n; and transmitting a serial data between the first device and the second device based on the clock signal.

An embodiment of a data transmission system is disclosed. The system comprises a first device, a second device including a buffer and a memory and a data line. The data line transmits a bitstream between the first device and the second device, wherein the bitstream comprises a first segment, a second segment and a data segment. The first segment includes at least one bit for indicating a transmission mode between the first device and the second device. The second segment includes at least one bit, wherein when the transmission mode is a first transmission mode, the second segment comprises m bits for indicating an address in the memory, and when the transmission mode is a second transmission mode, the second segment comprises n bits for indicating whether the buffer is full, and m is larger than n. The data segment is arranged after the first segment for transmitting a serial data to the first device or the second device.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
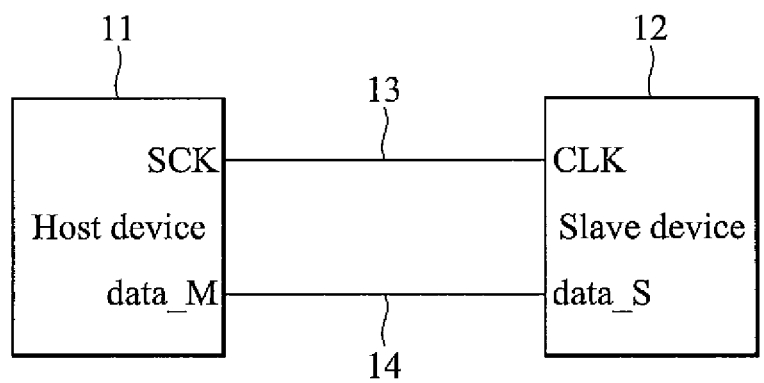
FIG. 1 is a schematic diagram of an embodiment of a serial data transmission system according to the invention.

FIG. 1 is a schematic diagram of an embodiment of a serial data transmission system according to the invention. The serial data transmission system comprises a host device 11, a stave device 12, a clock signal line 13 and a data line 14. The clock signal line 13 is coupled to the clock output terminal SCK of the host device 11 and the clock input terminal CLK of the slave device 12. The data line 14 is coupled to the data transmission terminal data_M of the host device 11 and the data transmission terminal data_S of the slave device 12. The host device 11 transmits a clock signal to the slave device 12 via the clock signal line 13 such that the host device 11 and the slave device 12 can be synchronized to transmit data therebetween. After the host device 11 and the slave device 12 are synchronized, a bitstream can be transmitted via the data line 14 between the host device 11 and the slave device 12. The bitstream comprises a plurality of segments, such as a first segment, a second segment and a data segment. The first segment can be sent by the host device 11 and comprises at least one bit for indicating a transmission mode. The second segment can also be sent by the host device 11 and comprises at least one bit for indicating the data in the data segment is to be written to the slave device 12 or read from the slave device 12. For example, one bit can be used for indicating a writing operation or a reading operation. If the value of the bit is 0, the data in the data segment is to be written to the slave device 12. If the value of the bit is 1, the data in the data segment is read from the slave device 12. In another embodiment, a plurality of bits can be used to define different read operations or write operations. The bitstream can further comprise a third segment including at least one bit for indicating the state of a storage device, such as a memory, or a writing buffer in the slave device 12. The host device 11 can determine, based on the state, whether to write data to the slave device 12. In another embodiment, the third segment can indicate an address or a state of a storage device in the host device 11 or in the slave device 12, or indicate an instruction. For example, the third segment comprises an address for indicating an memory address of a storage device, to which the data to be written into the slave device 12 from the host device 11 will be sent and stored, in the slave device 12, or indicating an memory address of the storage device, at which the data to be written into the slave device 12 from the host device 11 is located, in the host device 11. When the host device 11 performs a writing operation to the slave device 12, the data segment is output by the host device 11 and then written to the slave device 12. When the host device 11 performs a reading operation to the slave device 12, the data segment is output by the slave device 12 and then written to the host device 11. The data segment is arranged after the third segment, and the format of the data in the data segment can be determined based on the first segment.

Figure 2:
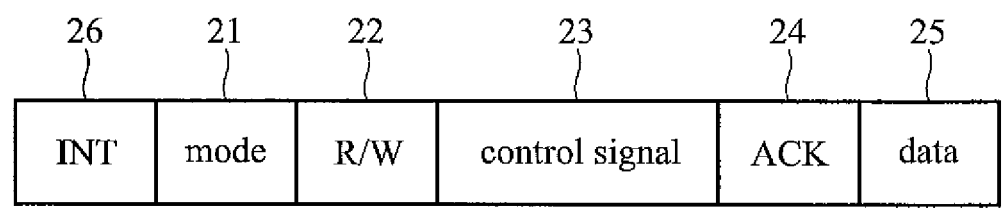
FIG. 2 is a schematic diagram of a data format for the transmission system according to an embodiment of the invention.

FIG. 2 is a schematic diagram of a data format for the transmission system according to an embodiment of the invention. The data format includes a first segment 21, a second segment 22, a third segment 23, a fourth segment 24, a fifth segment 25 and a sixth segment 26. The first segment 21 comprises at least one bit, which can be sent by a host device, for indicating a transmission mode. The second segment 22 comprises at least one bit, which represents a read/write signal, for indicating that the host device performs a reading operation or a writing operation to the slave device. The second segment 22 can also include a plurality of bits for indicating different writing operations or reading operations. The third segment 23 comprises at least one bit for representing a control signal. In this embodiment, the control signal may be only one bit for indicating the state of a storage device, such as a memory, in the host device or the slave device. In another embodiment, the control signal comprises a plurality of bits for indicating different instructions of the host device, and the slave device executes data transmissions or other operations based on the instructions. In another embodiment, the control signal may includes a plurality of bits for representing a start memory address of the storage device, to which the data to be written into the slave device from the host device will be sent and stored, in the slave device, or representing an memory address of the storage device, at which the data to be written into the slave device from the host device is located, in the host device. The fourth segment 24 comprises at least one bit, which is sent by the slave device and represents an acknowledge signal. When the slave device receives the control signal from the host device, the slave device sends the acknowledge signal to the host device to inform that the control signal has been received. In this embodiment, the value of the bit of the acknowledge signal may be "1" or "0". In another embodiment, the slave device can combine other signal with the acknowledge signal and transmit the combined signal to the host device, wherein the other signal may indicate the state of the storage device of the slave device. The fifth segment 25 comprises a plurality of bits for representing a serial data signal and the format of the serial data signal is determined based on the transmission mode of the first segment 21. In another embodiment, the format of the serial data signal is further determined based on the control signal of the third segment 23.

In another embodiment, a sixth segment 26 is added. The sixth segment 26 comprises at least one bit to represent an interrupt signal INT sent by the slave device. After the host device receives the interrupt signal INT, the slave device operates at an active mode and the data transmission is controlled by the slave device rather than the host device. If the host device does not receive the interrupt signal, the host device operates at an active mode and the control of the data transmission is switched to the host device. In one embodiment, the host device is an electronic device with a data processing or computing capabilities. The host device can be a personal computer, laptop or a personal digital assistant (PDA) and the slave device can be a data access device, such as a digital camera, webcam, ip cam, heartbeat rate monitor, personal pulse indicator or hard disc. When the electronic device is electrically connected to the data access device, the electronic device first detects whether the data access device outputs an interrupt signal INT. If not, the data access device is controlled by the electronic device. When there is no data to be transmitted between the electronic device and the data access device, the electronic device outputs a control signal to control the data access device to enter a sleep mode so as to save power consumption. When the electronic device detects the interrupt signal INT sent by the data access device, the control of the data transmission between the electronic device and the data access device is switched to the data access device. In this embodiment, the electronic device may operate at a sleep mode or idle mode, and the data access device can transmit a control signal to wake up the electronic device from the sleep mode or the idle mode. In another embodiment, the data access device can wake up the electronic device via internet by a remote control function.

Figure 3:
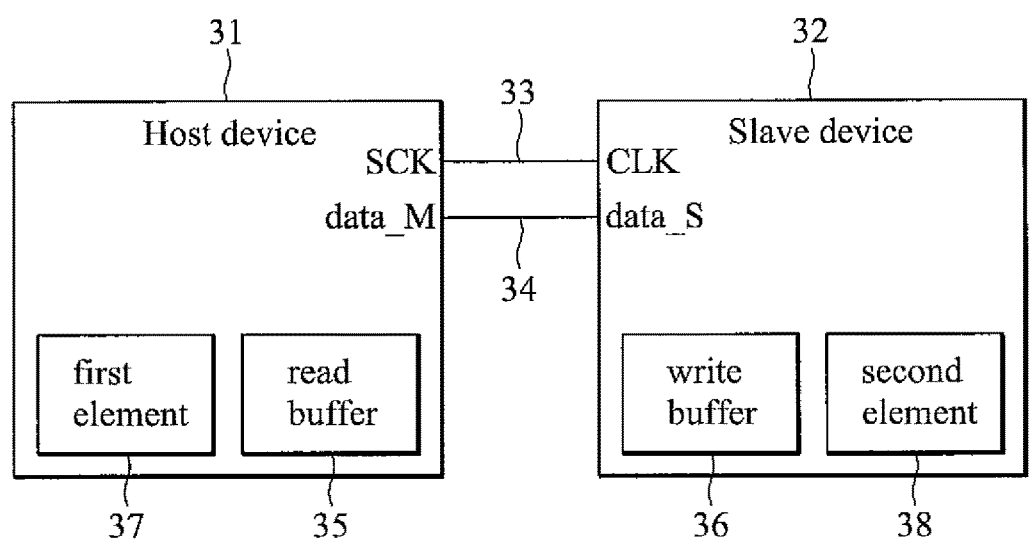
FIG. 3 is a schematic diagram of another embodiment of the data transmission system according to the invention.
Figure 4:
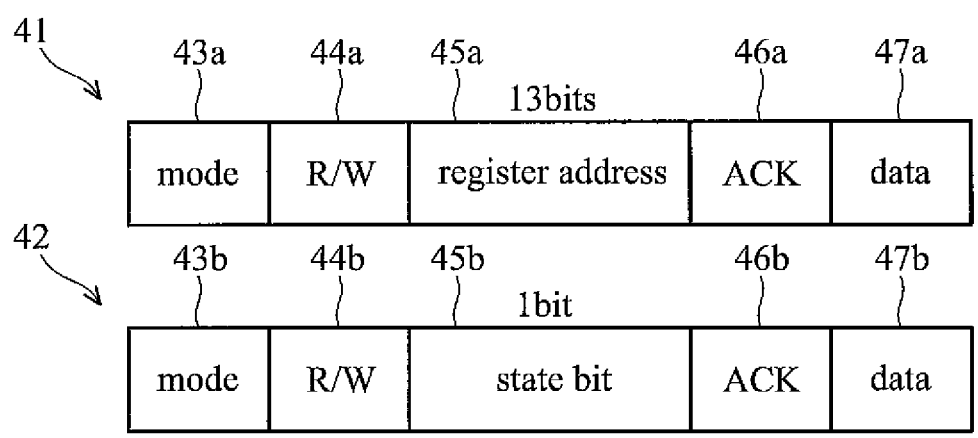
FIG. 4 shows two data formats of two different transmission modes according to an embodiment of the invention.

FIG. 3 is a schematic diagram of another embodiment of the data transmission system according to the invention. The data transmission system comprises a host device 31, a slave device 32, a clock signal line 33 and a data line 34. The data lines 33 is coupled between the clock output terminal SCK of the host device 31 and the clock input terminal CLK of the slave device 32. The data line 34 is coupled between the data transmission terminal data_M of the host device 31 and the data transmission terminal data_S of the slave device 32. The host device 31 transmits a clock signal to the slave device 32 via the clock signal line 33 such that the host device 31 and the slave device 32 can be synchronized to transmit data therebetween. After the host device 31 and the slave device 32 are synchronized, a bitstream can be transmitted via the data line 34 between the host device 31 and the slave device 32. The host device 31 comprises a first element 37 and a reading buffer 35. The slave device 32 comprises a second element 38 and a writing buffer 36. In this embodiment, the data transmission between the host device 31 and the slave device 32 can be performed under two modes. The first mode is a mode for normal data transmission, and the second mode is a mode for rapid data transmission. For further discussion of the data format of the two modes, please refer to FIG. 4.

When the data transmission between the host device 31 and the slave device 32 is performed under the first mode, the bitstream 41 is applied. The bitstream 41 includes a first segment 43a, a second segment 44a, a third segment 45a, a fourth segment 46a and a fifth segment 47a. The first segment 43a comprises one bit. When the value of the bit is 0, the data transmission between the host device 31 and the slave device 32 is performed under the first mode. When the value of the bit is 1, the data transmission between the host device 31 and the slave device 32 is performed under the second mode. The second segment 44a comprises a read/write (R/W) bit for indicating that the host device 31 performs a reading operation or a writing operation to the slave device 32. When the value of the R/W bit is 1, the host device 31 performs the reading operation to read data from the slave device 32. When the value of the R/W bit is 0, the host device 31 performs the writing operation to write data to the slave device 32. The third segment 45a indicates a register address, which is sent by the host device 31. When the host device 31 writes data to the slave device 32, the host device 31 first writes data to the writing buffer 36 and then sends the register address to the slave device 32. Afterwards, the slave device 32 reads data from the writing buffer 36 and then writes the read data to a register of the second element 38 according to the register address. In one embodiment, the second element 38 is an LED and the host device 31 writes data to a register of the LED to control the operation of the LED. In addition, when the host device 31 reads data from the slave device 32, the slave device 32 first writes the data from the register of the second element 38 to the reading buffer 35. Afterwards, the host device 31 reads data from the reading buffer 35 and then writes the read data to a register of the first element 37. The fourth segment 46a comprises at least one bit which represents an acknowledge signal ACK. When the slave device 32 receives the address sent by the host device 31, the slave device 32 generates the acknowledge signal ACK for responding to the host device 31. The fifth segment 47a comprises a plurality of bits for representing a serial data signal and the format of the serial data signal is determined based on the transmission mode of the first segment 43a.

When the data transmission between the host device 31 and the slave device 32 is performed under the second mode, the bitstream 42 is applied. The bitstream 42 includes a first segment 43b, a second segment 44b, a third segment 45b, a fourth segment 46b and a fifth segment 47b. The first segment 43b comprises one bit. When the value of the bit is 1, the data transmission between the host device 31 and the slave device 32 is performed under the second mode. The second segment 44b comprises a read/write (R/W) bit for indicating that the host device 31 performs a reading operation or a writing operation to the slave device 32. When the value of the R/W bit is 1, the host device 31 performs the reading operation to read data from the slave device 32. When the value of the R/W bit is 0, the host device 31 performs the writing operation to write data to the slave device 32. The third segment 45b comprises a state bit for indicating whether the reading buffer 35 or the writing buffer 36 is full. When the reading buffer 35 or the writing buffer 36 is full, the state bit is set to 1, and when the reading buffer 35 or the writing buffer 36 is not full, the state bit is set to 0. When the host device 31 performs a fast writing operation to the slave device 32 and detects that the value of the state bit is 0, the host device 31 keeps writing data to the writing buffer 36 until the state bit is set to 1; meanwhile, the slave device 32 reads the data from the writing buffer 36 and writes the read data to the second element 38. In this embodiment, upon transmitting one data to the second element 38, the writing buffer 36 clears the transmitted data so as to release the memory space for receiving data from the host device 31. When the host device 31 performs a fast reading operation to the slave device 32 and detects that the value of the state bit is 1, the slave device 32 keeps writing data to the reading buffer 35 until the state bit is set to 0; meanwhile, the host device 31 reads the data from the reading buffer 35 and writes the read data to the first element 37. In this embodiment, upon transmitting one data to the first element 37, the reading buffer 35 clears the transmitted data so as to release the memory space for receiving data from the slave device 32. The fourth segment 46b comprises at least one bit for representing an acknowledge signal ACK. When the slave device 32 receives the state bit sent by the host device 31, the slave device 32 generates the acknowledge signal ACK for responding to the host device 31. The fifth segment 47b comprises a plurality of bits for representing a serial data signal and the format of the serial data signal is determined based on the transmission mode of the first segment 43b. In general data transmission, such as the first mode, the slave device 32 responds with an acknowledge signal ACK to the host device 31 after completely receiving a data from the host device 31, and the host device 31 begins to send the next data to the slave device 32 after receiving the acknowledge signal ACK. In the present embodiment, the host device 31 can write data to the writing buffer 36 or read data from the reading buffer 35 without receiving any acknowledge signal ACK for each written or read data so as to increase the data transmission speed.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data transmission method for a data transmission system including a first device and a second device, comprising:

transmitting a clock signal to synchronize the first device and the second device wherein the second device includes a buffer and a memory;

transmitting a mode signal from the first device to the second device, wherein the mode signal indicates a transmission mode between the first device and the second device; and transmitting a serial data between the first device and the second device based on the clock signal, wherein the serial data comprises a plurality of bits for representing a plurality of serial data, at least part of the plurality of bits constituting a control signal, and the control signal has different numbers of bits in each serial data corresponding to different transmission modes, wherein a length of the control signal is determined based on the mode signal, and the length of the control signal is not zero, and wherein when the transmission mode is a first transmission mode, the control signal comprises m bits where m is equal to finite number for indicating a memory address.

2. The method as claimed in claim 1, wherein when the transmission mode is a second transmission mode, the control signal comprises n bits for indicating whether a buffer is full and m is larger than n where m and n are equal to a finite number.

3. The method as claimed in claim 1, further comprising:
transmitting an acknowledge signal from the second device to the first device to inform the first device that the second device has received the control signal.

4. A data transmission system, comprising:
a first device;
a second device including a buffer and a memory;
a clock signal line, coupled between the first device and the second device, for transmitting a clock signal to synchronize the first device and the second device; and
a data line for transmitting a mode signal from the first device to the second device and for transmitting a serial data between the first device and the second device based on the clock signal;
wherein the mode signal indicates a transmission mode between the first device and the second device, and the serial data comprises a plurality of bits for representing a plurality of serial data, at least part of the plurality of bits constituting a control signal, and the control signal has different numbers of bits in each serial data corresponding to different transmission modes,
wherein a length of the control signal is determined based on the mode signal, and the length of the control signal is not zero, and
wherein when the transmission mode is a first transmission mode, the control signal comprises m bits for indicating a memory address.

5. The system as claimed in claim 4, wherein the data line is further configured to transmit at least one bit between the first device and the second device for indicating a writing or reading operation in the buffer.

6. The system as claimed in claim 4, wherein the data line is further configured to transmit at least one bit from the second device to the first device for indicating an acknowledge signal to inform the first device that the second device has received the control signal.

7. A data transmission system, comprising:
a first device;
a second device including a buffer and a memory;
a clock signal line, coupled between the first device and the second device, for transmitting a clock signal to synchronize the first device and the second device; and
a data line for transmitting a mode signal from the first device to the second device and for transmitting a plurality of serial data between the first device and the second device based on the clock signal,
wherein the mode signal indicates a transmission mode between the first device and the second device, and the length of each serial data is determined based on the transmission mode,
wherein the data line is further configured to transmit a control signal from the first device to the second device based on the clock signal,
wherein the length of the control signal is determined based on the mode signal, and,
wherein when the transmission mode is a second transmission mode, the control signal comprises n bits where n is equal to a finite number for indicating whether the buffer is full.

* * * * *